US009942780B2

United States Patent
Zhang et al.

(10) Patent No.: US 9,942,780 B2
(45) Date of Patent: Apr. 10, 2018

(54) AUTOMATED ACTION BASED ON ROAMING SATISFACTION INDICATOR

(71) Applicant: iBasis, Inc., Lexington, MA (US)

(72) Inventors: Shuping Zhang, Sudbury, MA (US); Mauro Mattos Silva Araujo, Chelmsford, MA (US)

(73) Assignee: iBasis, Inc., Lexington, MA (US)

( * ) Notice: Subject to any disclaimer, the term of this patent is extended or adjusted under 35 U.S.C. 154(b) by 21 days.

(21) Appl. No.: 15/246,834

(22) Filed: Aug. 25, 2016

(65) Prior Publication Data

US 2018/0063724 A1 Mar. 1, 2018

(51) Int. Cl.
| | |
|---|---|
| H04W 24/02 | (2009.01) |
| H04L 29/08 | (2006.01) |
| H04L 12/707 | (2013.01) |
| H04L 12/24 | (2006.01) |
| H04W 8/18 | (2009.01) |
| H04M 15/00 | (2006.01) |
| H04W 24/08 | (2009.01) |
| H04W 68/00 | (2009.01) |

(52) U.S. Cl.
CPC ......... *H04W 24/02* (2013.01); *H04L 41/0659* (2013.01); *H04L 45/22* (2013.01); *H04L 67/02* (2013.01); *H04M 15/8038* (2013.01); *H04W 8/18* (2013.01); *H04W 24/08* (2013.01); *H04W 68/00* (2013.01)

(58) Field of Classification Search
CPC ...... G06C 30/02; H04W 24/02; H04W 28/16; H04W 48/20
USPC ................... 455/406, 422.1, 423, 432.1, 558
See application file for complete search history.

(56) References Cited

U.S. PATENT DOCUMENTS

| | | |
|---|---|---|
| 7,328,262 B2 | 2/2008 | McDonagh et al. |
| 8,441,955 B2 | 5/2013 | Wilkinson et al. |
| 8,861,691 B1 | 10/2014 | De et al. |
| 8,964,582 B2 | 2/2015 | Wilkinson |
| 9,088,768 B1 | 7/2015 | Bordner-Babayigit et al. |
| 2008/0004015 A1 | 1/2008 | Jones et al. |
| 2008/0056144 A1 | 3/2008 | Hutchinson et al. |
| 2014/0089040 A1 | 3/2014 | Nandan et al. |

(Continued)

FOREIGN PATENT DOCUMENTS

WO    WO 2015/043627 A1    4/2015

OTHER PUBLICATIONS

"Preparing for the New EU Roaming Regulations, New Opportunities on a New Playing Field", Syniverse, 11 pgs. (2016).

(Continued)

*Primary Examiner* — Sam Bhattacharya
(74) *Attorney, Agent, or Firm* — Hamilton, Brook, Smith & Reynolds, P.C.

(57) ABSTRACT

A method or corresponding apparatus for performing an automated action based on a roaming satisfaction indicator (RSI). A roaming satisfaction indicator for each individual mobile subscriber at a given time is evaluated by determining an age for each stored event by comparing the time the event was identified and the given time, assigning a current value to each of the stored events as a function of the determined age, the predetermined event type, and the predetermined impact level, and compiling the assigned current values of the events, resulting in the roaming satisfaction indicator at the given time. Based on the evaluated RSI, an action is automatically performed.

22 Claims, 10 Drawing Sheets

(56) References Cited

U.S. PATENT DOCUMENTS

2014/0122594 A1   5/2014   Uzunalioglu et al.

OTHER PUBLICATIONS

"Proactive Service Monitoring (Roaming Service Management and Troubleshooting Faults)", what-when-how, In Depth Tutorials and Information, Retrieved from Internet URL: http://what-when-how.com/roaming-in-wireless-networks/proactive-service-monitoring-roaming-service-management-and-troubleshooting-faults/ on Apr. 21, 2016.

"Quality of Experience for Mobile Data Networks", Citrix White paper (WP-QoExp-0822-A), 12 pgs.

"Quality of Service-General Concepts (Roaming Service Management and Troubleshooting Faults)", what-when-how, In Depth Tutorials and Information, Retrieved from Internet URL: http://what-when-how.com/roaming-in-wireless-networks/quality-of-servicegeneral-concepts-roaming-service-management-and-troubleshooting-faults/ on Apr. 21, 2016.

"Roaming Service Quality (Roaming Service Management and Troubleshooting Faults)", what-when-how, In Depth Tutorials and Information, Retrieved from Internet URL: http://what-when-how.com/roaming-in-wireless-networks/roaming-service-quality-roaming-service-management-and-troubleshooting-faults/ on Apr. 21, 2016.

"Syniverse User Experience Management", Syniverse, 5 pgs. (2016).

"Video and Audio Quality Assurance", Tektronix White Paper, 12 pgs. (2012).

Chin, K. S. et al., "Performance improvement of international roaming service, a benchmarking study", *Benchmarking: An International Journal*, 8(2): 120-131 (2001).

| OCTETS | BITS | | | | | | | |
|---|---|---|---|---|---|---|---|---|
| | 8 | 7 | 6 | 5 | 4 | 3 | 2 | 1 |
| 1 | VERSION | | | PT | (*) | E | S | PN |
| 2 | MESSAGE TYPE | | | | | | | |
| 3 | LENGTH (1st OCTET) | | | | | | | |
| 4 | LENGTH (2nd OCTET) | | | | | | | |
| 5 | TUNNEL ENDPOINT IDENTIFIER (1st OCTET) | | | | | | | |
| 6 | TUNNEL ENDPOINT IDENTIFIER (2nd OCTET) | | | | | | | |
| 7 | TUNNEL ENDPOINT IDENTIFIER (3rd OCTET) | | | | | | | |
| 8 | TUNNEL ENDPOINT IDENTIFIER (4th OCTET) | | | | | | | |
| 9 | SEQUENCE NUMBER (1st OCTET)$^{1) \ 4)}$ | | | | | | | |
| 10 | SEQUENCE NUMBER (2nd OCTET)$^{1) \ 4)}$ | | | | | | | |
| 11 | N-PDU NUMBER$^{2) \ 4)}$ | | | | | | | |
| 12 | NEXT EXTENSION HEADER TYPE$^{3) 4)}$ | | | | | | | |

—201

—203

VERSION - 1
PT - PROTOCOL TYPE - 1
E - EXTENSION HEADER FLAG
S - SEQUENCE NUMBER FLAG
PN - N-PDU NUMBER FLAG
TEID - TUNNEL ENDPOINT IDENTIFIER

FIG. 2A

| OCTETS | BITS | | | | | | | |
|---|---|---|---|---|---|---|---|---|
| | 8 | 7 | 6 | 5 | 4 | 3 | 2 | 1 |
| 1 | VERSION | | | | | SPARE | SPARE | SPARE |
| 2 | MESSAGE TYPE | | | | | | | |
| 3 | MESSAGE LENGTH (1st OCTET) | | | | | | | |
| 4 | MESSAGE LENGTH (2nd OCTET) | | | | | | | |
| m to k(m+3) | IF T FLAG IS SET TO 1, THEN TEID SHALL BE PLACED INTO OCTETS 5-8. OTHERWISE, TEID FIELD IS NOT PRESENT AT ALL. | | | | | | | |
| n to (n+2) | SEQUENCE NUMBER | | | | | | | |
| (n+3) | SPARE | | | | | | | |

—205

VERSION - 2
P - PIGGYBACK FLAG
T - TEID FLAG
TEID - TUNNEL ENDPOINT IDENTIFIER

FIG. 2B

ILLUSTRATION OF RSI CALCULATION

| EVENT | EVENT TYPE | EVENT IMPACT | EVENT TIME | CURRENT TIME | EVENT AGE MIN | WEIGHT AS A FUNCTION OF EVENT TYPE AND AGE OF EVENT | RSI OF EVENT |
|---|---|---|---|---|---|---|---|
| 1 | AUTHENTICATION FAILURE | -2 | 2:40:00 | 3:40:00 | 60 | 0.5000 | -1.00 |
| 2 | AUTHENTICATION SUCCESS | 4 | 3:16:00 | 3:40:00 | 24 | 0.8000 | 2.99 |
| 3 | MULTIPLE LOCATION UPDATE IN SHORT PERIOD OF TIME | -3 | 3:16:00 | 3:40:00 | 24 | 0.8000 | -2.24 |
| 4 | AUTHENTICATION SUCCESS | 4 | 3:22:00 | 3:40:00 | 18 | 0.8500 | 3.59 |
| 5 | LOCATION UPDATE SUCCESS | 2 | 3:22:00 | 3:40:00 | 18 | 0.8500 | 1.79 |
| 6 | SESSION START REQUEST WITH NO RESPONSE | -8 | 3:32:00 | 3:40:00 | 8 | 0.9333 | -7.85 |
| 7 | SESSION START REQUEST WITH RESPONSE | 6 | 3:36:00 | 3:40:00 | 4 | 0.9667 | 5.94 |
| 8 | SESSION THROUGHPUT LESS THAN 10% OF EXPECTED BANDWIDTH | -10 | 3:39:00 | 3:40:00 | 1 | 0.9917 | -9.95 |
| | | | | | | RSI | -6.73 |

FIG. 8

ILLUSTRATION OF RSI CALCULATION

| EVENT | EVENT TYPE | EVENT IMPACT | PERCENT OF IMPACT THAT WILL DECAY | EVENT IMPACT STABILIZATION VALUE | EVENT HALF-LIFE | EVENT TIME | CURRENT TIME | EVENT AGE MINUTES | WEIGHT AS A FUNCTION OF EVENT TYPE AND AGE OF EVENT | RSI OF EVENT |
|---|---|---|---|---|---|---|---|---|---|---|
| 1 | AUTHENTICATION FAILURE | -2 | 100% | 0 | 30 | 3:10:00 | 3:40:00 | 30 | 0.5000 | -1.00 |
| 2 | AUTHENTICATION SUCCESS | 4 | 80% | 0.8 | 30 | 3:16:00 | 3:40:00 | 24 | 0.7972 | 3.19 |
| 3 | MULTIPLE LOCATION UPDATE IN SHORT PERIOD OF TIME | -3 | 50% | -1.5 | 30 | 3:16:00 | 3:40:00 | 24 | 0.8732 | -2.62 |
| 4 | AUTHENTICATION SUCCESS | 4 | 90% | 0.4 | 30 | 3:22:00 | 3:40:00 | 18 | 0.9069 | 3.63 |
| 5 | LOCATION UPDATE SUCCESS | 2 | 20% | 1.6 | 30 | 3:22:00 | 3:40:00 | 18 | 0.9793 | 1.96 |
| 6 | SESSION START REQUEST WITH NO RESPONSE | -8 | 70% | -2.4 | 30 | 3:32:00 | 3:40:00 | 8 | 0.9869 | -7.90 |
| 7 | SESSION START REQUEST WITH RESPONSE | 6 | 100% | 0 | 30 | 3:36:00 | 3:40:00 | 4 | 0.9908 | 5.94 |
| 8 | SESSION THROUGHPUT LESS THAN 10% OF EXPECTED BANDWIDTH | -10 | 45% | -5.5 | 30 | 3:39:00 | 3:40:00 | 1 | 0.9976 | -9.98 |
| | | | | | | | | RSI | | -6.77 |

FIG. 9

AUTOMATED ACTION BASED ON ROAMING SATISFACTION INDICATOR

BACKGROUND

Service providers in general and mobile network operators (MNOs) in particular provide a range of communications' services to corresponding subscribers. Such services include, for example, voice, voice over Internet Protocol (IP), voice over long term evolution (LTE), streaming, broadcasting, multicasting, or other services. In providing such services, service providers typically implement different functionalities, e.g., billing functionalities, quality of service (QoS) functionalities, etc., to manage the offered services and the corresponding usage by subscribers.

In order to expand geographical coverage of offered services beyond the network coverage of each service provider, service providers typically engage in interworking and roaming arrangements. The interworking and roaming arrangements between different service providers are made possible through interconnection between the service providers. Interconnection between service providers is typically realized through one or more inter-service provider systems. Given that the Internet Protocol (IP) is widely employed across different communication networks and different services associated with service providers, the inter-service provider systems are typically designed to provide interconnection between different service providers at the IP traffic level, and to employ IP addressing. Examples of such inter-service provider systems include General Packet Radio Service (GPRS) Roaming eXchange (GRX) networks and IP Packet eXchange (IPX) networks. Interconnection between service providers may be achieved through an inter-service provider IP backbone, which represents a collection of GRX and/or IPX networks. Most data roaming traffic today is brokered by GRX/IPX providers that provide inter-operator connectivity for third generation (GRX) and Long Term Evolution (IPX) mobile networks.

SUMMARY

Mobile subscribers demand excellent quality data services, particularly if they are paying a premium for it. Mobile subscribers also expect that the quality of their service will continue when roaming on visited mobile networks. A bad roaming experience for a mobile subscriber can lead not only to missed roaming revenues for mobile network operators, but also to increased churn among the mobile network operators' most valuable customers.

Existing inter-service provider networks are configured to access tunnel-specific information in data packets exchanged across two tunnel end points between visited and home mobile networks. Typically, an inter-service provider network only accesses information associated with the first, second and third network layers within the exchanged data packets. A typical inter-service provider network, for example, does not access information within data packets indicative of user-specific or session specific data flows (e.g., information associated with the fourth and/or fifth network layers).

As such, existing inter-service provider networks often do not or are unable to provide control services for usage monitoring and quality of service (QoS), for example, at the individual mobile subscriber (UE) level. Thus, services' management functionalities that are typically performed by mobile operators, such as, monitoring a service usage by users while roaming, notifying users when usage reaches a certain level, enforcing QoS, or throttling control to each UE's data session, are not offered by the inter-service provider network given the limited visibility with respect to information associated with data packets exchanged across the inter-service provider network.

Embodiments of the present disclosure enable mobile operators to enhance their mobile subscriber's roaming experience and increase the mobile operators' competitive power by turning near real-time data analysis into actionable information. The systems and methods of the present disclosure provide a powerful monitoring, alarming, and reporting tool that enables a higher quality of data roaming service than ever before by proactively identifying and solving issues (often before roaming subscribers even notice a problem) and provide mobile operators with full visibility of their individual mobile subscriber's data roaming experience.

According to at least one example embodiment, the present disclosure may be implemented in the form of a method or corresponding apparatus for performing an automated action based on a roaming satisfaction indicator (RSI). The at least one example embodiment includes monitoring a plurality of mobile signals (e.g. various protocols used in mobile communication) and metrics for each individual mobile subscriber in a group, and identifying a plurality of events affecting each individual mobile subscriber in the group, each event being identified based on predetermined combinations of one or more of the plurality of mobile signals and metrics. The at least one example embodiment further stores each identified event in a memory location with a time the event was identified, a predetermined event type, and a predetermined impact level.

According to the at least one example embodiment, a roaming satisfaction indicator for each individual mobile subscriber at a given time and/or over a given period of time is evaluated by: determining an age for each stored event by comparing the time the event was identified and the given time, assigning a current value to each of the stored events as a function of the determined age, the predetermined event type, and the predetermined impact level, and compiling the assigned current values of the events, resulting in the roaming satisfaction indicator at the given time. The at least one example embodiment then automatically performs an action based on at least one roaming satisfaction indicator at the given time.

According to at least one other example embodiment, the roaming satisfaction indicator of each individual mobile subscriber in the group at the given time is aggregated, resulting in an aggregated roaming satisfaction indicator. According to another aspect of the example embodiment, an automated action is performed based on the aggregated roaming satisfaction indicator.

According to at least one other example embodiment, the roaming satisfaction indicators are aggregated based on a combination of factors. According to at least one other aspect of the example embodiment, the combination of factors includes the region where the visited mobile network is located, roaming (or visited) mobile carrier, or originating mobile carrier the mobile subscriber belongs to.

According to at least one other example embodiment, the roaming satisfaction indicator of a given individual mobile subscriber in the group at the given time is decomposed, resulting in at least one decomposed part of the roaming satisfaction indicator, and an action is automatically performed based on the at least one decomposed part of the roaming satisfaction indicator. According to further embodiments, the automatically performed action may be reconfiguring one or more network routers. According to other embodiments, the automatically performed action may be blocking data service or rerouting data service traffic using different paths among one or more mobile networks.

According to at least one other example embodiment, the automatically performed action may be switching the respective individual mobile subscriber's visited network. In some embodiments, switching the respective individual mobile subscriber's visited network is performed by using over the air (OTA) commands sent to the respective individual mobile subscriber's mobile device. For non-limiting example, OTA commands can cause respective individual mobile subscriber's mobile device to refresh enabling the mobile device to connect or attach to another visited network.

In other embodiments, the automatically performed action may be alerting the respective individual mobile subscriber of data roaming service issues. In some embodiments, alerting the respective individual mobile subscriber may include instructing the respective individual mobile subscriber to execute one more tasks on respective individual mobile subscriber's mobile device. For non-limiting example, instructing respective individual mobile subscriber to power cycle their mobile device.

In other embodiments, the automatically performed action may be alerting a mobile network operator of data roaming service issues. In some embodiments, alerting the network operator may include instructing the network operator to execute one more tasks on the network operator's mobile network. For non-limiting example, instructing the mobile network operator to reset an Evolved Packet Core (EPC) network element signaling link.

At least one other example embodiment includes determining a respective individual mobile subscriber's data plan is negatively affecting the respective roaming satisfaction indicator, wherein the action is offering the respective individual mobile subscriber a different data plan and updating the respective individual mobile subscriber's data plan.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 2A shows the GTPv1-C and GTP-U message header format.

FIG. 2B shows the GTPv2-C message header format.

FIG. 8 is an illustration of an example RSI calculation with a linear decay.

FIG. 9 is an illustration of an example RSI calculation with an exponential decay.

DETAILED DESCRIPTION

A description of example embodiments of the invention follows.

Figure 1:
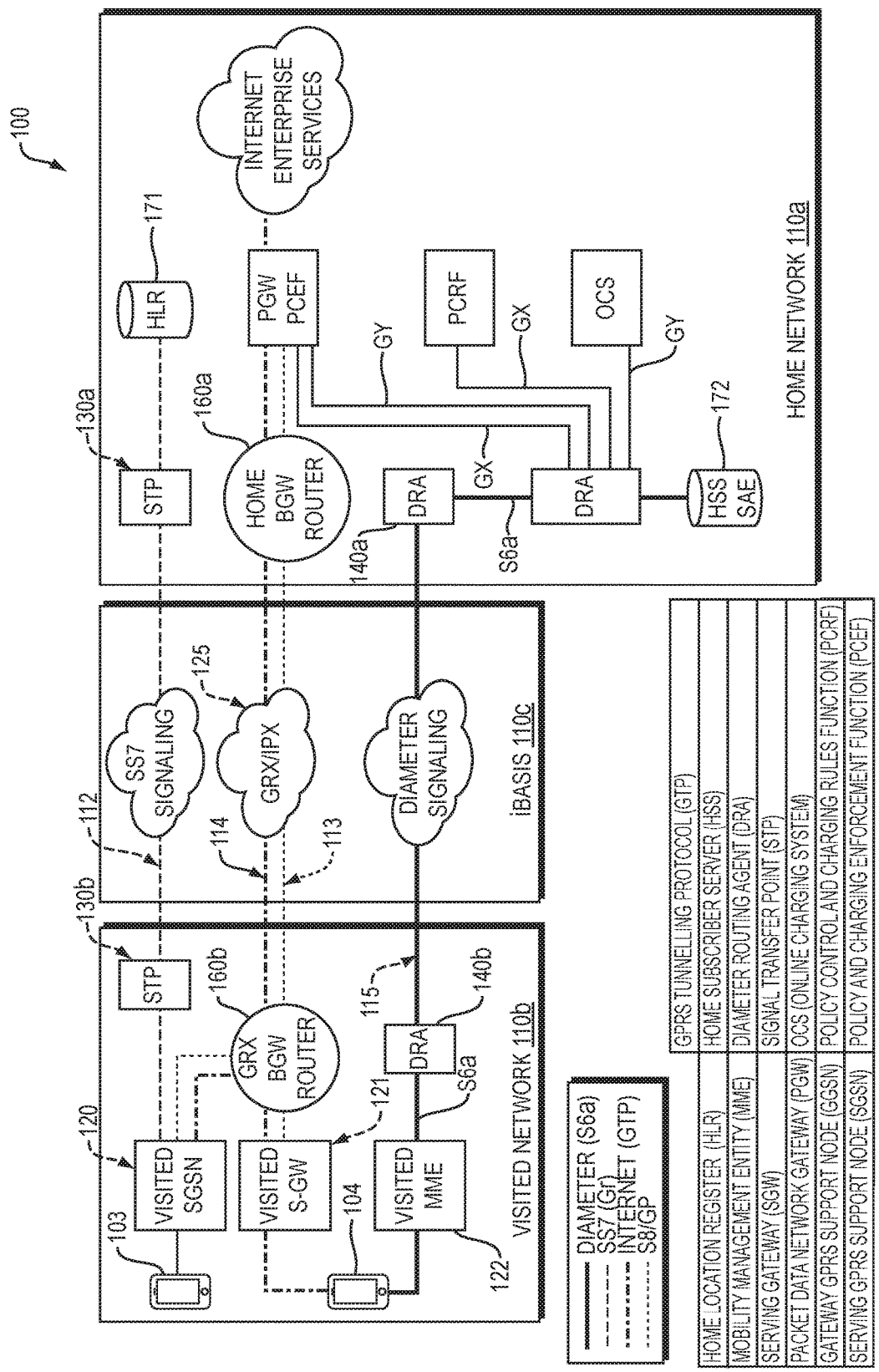
FIG. 1 is a block diagram illustrating an example reference architecture for LTE and 3G data roaming service.

FIG. 1 is a block diagram of an example reference architecture 100 supporting LTE and 3G data roaming service between wireless networks. According to the example architecture as shown in FIG. 1, the user equipment (UE) 103 (i.e., a mobile device of an individual roaming mobile subscriber), which is associated with the home mobile network 110a, acquires 3G data service through the visited mobile network 110b. UE 103 sends an attachment request with UE 103's International Mobile Subscriber Identity (IMSI) to the Visited Serving GPRS Support Node (VSGSN) 120 on the visited mobile network 110b. The VSGSN 120 initiates the authentication procedure with the home mobile network 110a by routing the authentication signaling, with an SS7 interface 112, through the visited Signal Transfer Point (STP) 130b, an inter-service provider GRX/IPX network 110c, and the home STP 130a to the Home Location Register (HLR) 171. The SS7 interface 112 is a tunnel protocol that is used to enable the visiting mobile network 110b to access the subscriber information contained in the HLR 171.

According to another aspect of FIG. 1, the VSGSN 120 interfaces with the Border Gateway 160b establish GPRS tunneling protocol (GTP) tunnels between the visited mobile network 110b and the home mobile network 110a, through the inter-service provider GRX/IPX network 110c.

GTP is a 3GPP standardized protocol that was designed to tunnel traffic within and between mobile data networks. It is widely deployed in several interfaces including 3G and LTE data network architectures. GTP is utilizes GTP-U to carry user (data) traffic and GTP-C to carry control procedures and signaling. GTP uses UDP/IP tunnels to carry the user IP payload and control messages, specifically UDP port 2123 for GTP-C, and UDP port 2152 for GTP-U. There is a single version of GTP-U protocol (GTPv1-U) defined in 3GPP TS 29.281, herein incorporated by reference. There are two versions of GTP-C protocol, GTPv1-C and GTPv2-C. GTPv1-C protocol is used by 3G data networks and is defined in 3GPP TS 29.060 (herein incorporated by reference), and GTPv2-C protocol is used by LTE data networks and defined in 3GPP TS 29.274, (herein incorporated by reference).

FIG. 2A shows the GTPv1-C message header format. The Sequence Number Flag 201 is the second bit in the $1^{st}$ Octet of the GTPv1-C message header. The Sequence Number Flag 201 indicates whether or not there is a meaningful value in the Sequence Number Field 203. The Sequence Number Field 203 is used as a transaction identifier if a subsequent message expected, for example a Create PDP Context Request would have the same value in the Sequence Number Field as the subsequent response message (Create PDP Context Response) to confirm the response is directly related to the request, completing the transaction.

GTPv1-C messages may contain several Information Elements (IEs). There are numerous types of IEs, some of which are analyzed by embodiments of the present disclosure, examples of such are listed and detailed below. One type of IE is a Cause. In regards a request message, the Cause indicates the reason for the request. In regards to a response message, the Cause indicates the acceptance or the rejection of the corresponding request, and may further indicate the reason the request was accepted or rejected.

FIG. 2B shows the GTPv2-C message header format. The Sequence Number Field 205 is used as a transaction identifier if a subsequent message is expected, for example a Create Session Request would have the same value in Sequence Number Field 205 as its subsequent response message (Create Session Response) to confirm the response is directly related to the request, completing the transaction.

GTPv2-C messages may contain several Information Elements (IEs). There are numerous types of IEs, some of which are analyzed by embodiments of the present disclosure, examples of such are listed and detailed below.

The GTP-U message header format is the same as the GTPv1-C message header shown in FIG. 2A. GTP-U Tunnels are used to carry Transaction Protocol Data Units (T-PDUs) and signaling messages between a given pair of GTP-U Tunnel Endpoints. The Tunnel Endpoint ID (TEID) in the GTP header indicates which tunnel a certain T-PDU belongs to. In this way, packets are multiplexed and de-multiplexed by GTP-U between a given pair of Tunnel Endpoints. User payload (i.e., user data) is transmitted in G-PDU packets. A G-PDU is a packet including a GTP-U header and a T-PDU. Unlike, GTP-C messages, G-PDUs do not include any IEs.

Referring back to FIG. 1, there are separate GTP tunnels to communicate user plane data and control plane messages for 3G roaming data service. The GTP-U tunnel 114 conveys user plane data through the inter-service provider network 110c and the GTPv1-C tunnel 113 conveys control plane messages and signaling. The GTP tunnels communicate 3G data access and service between UE 103 and the home mobile network 110a.

According to another aspect of FIG. 1, the UE 104, which may also be associated with the home mobile network 110a, acquires Long Term Evolution (LTE) data service through the visited mobile network 110b. FIG. 1 shows UE 103 and UE 104 as two separate devices each using 3G and LTE data roaming, respectively. Alternatively, UE 103 and UE 104 could be a single device capable of switching between 3G and LTE data roaming depending on any number of factors including signal availability/strength.

Similar to UE 103, UE 104 sends an attachment request with UE 104's IMSI to the Visited Mobility Management Entity (MME) 122 on the visited mobile network 110b. The MME 122 initiates the authentication and validation procedure with the home mobile network 110a by routing the authentication and validation signaling, with an Diameter S6a/S6d interface 115, through the visited Diameter Routing Agent 140b, the interconnect network 110c, and the home DRA 140a to the Home Subscriber Server (HSS) 172. The Diameter 6a interface 115 allows the visiting mobile network 110b to access the subscriber information contained in the HSS 172 for authentication purposes. The Diameter S6a/S6d protocol is defined in 3GPP TS 29.272, herein incorporated by reference.

According to another aspect of FIG. 1, the visited Serving Gateway (S-GW) 121 interfaces with the Border Gateway 160b establish GTP tunnels between the visited mobile network 110b and the home mobile network 110a, through the transit network's GRX/IPX 125. Similar to 3G, there are separate GTP tunnels to communicate user plane data and control plane messages and signaling for LTE roaming data service. LTE utilizes the same GTP-U tunnel 114 as 3G to convey user plane data through the transit network 110c and a separate GTP-C tunnel 113 to convey control plane messages. Optionally, a Diameter S9 interface (not shown) may be used between the visited mobile network 110b and the home mobile network 110a for subscriber policy enforcement.

Embodiments of the present disclosure enable enhanced monitoring and analytics of the quality of an individual mobile subscriber's roaming experience in pseudo-real time by placing smart passive probes along the GTP tunnels and the Diameter S6a/S6d interface. The smart passive probes may be placed anywhere on the physical interfaces between the border gateways (160b, 160a, 140b, and 140a) of the visited mobile network 110b and the home mobile network 110a, including in the inter-service provider network 110c. According to some embodiments, the smart passive probes may be either passive tap probes or passive inline probes.

Figure 3:
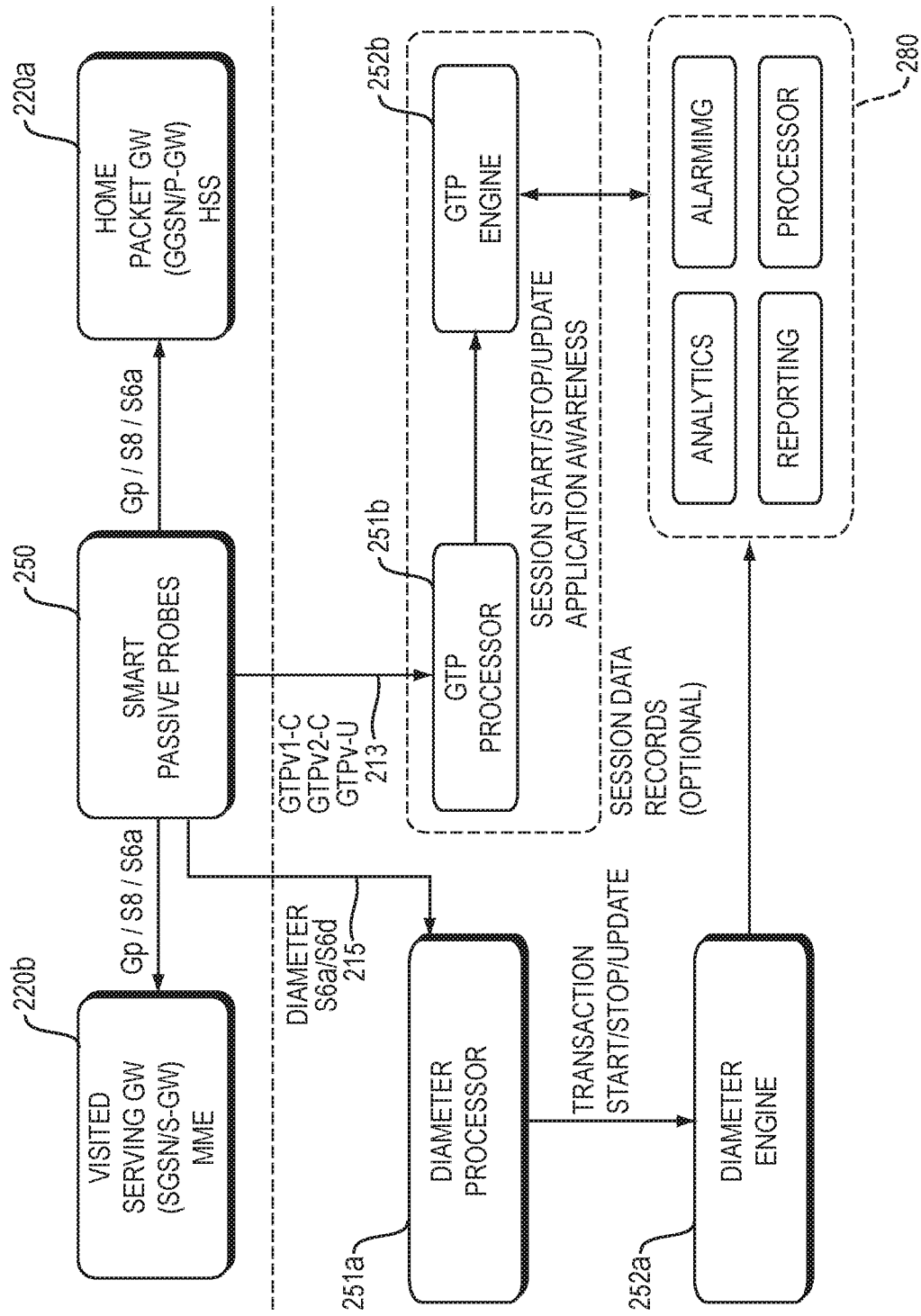
FIG. 3 is a high level block diagram illustrating the extraction and processing of mobile signals and metrics.

FIG. 3 is a high level block diagram illustrating the extraction and processing of mobile signals and metrics. According to some embodiments, the smart passive probes 250 are placed along the physical interfaces between the visited serving gateways 220b and the home packet gateways 220a. According to some embodiments, the smart passive probes 250 may be network taps placed on physical cables or inline passive probes placed inline with the physical cable. Example smart probes include network monitoring devices manufactured by PROCERA and NETSCOUT.

According to some embodiments, the smart passive probes 250 passively intercept data and control communications for each individual mobile subscriber (e.g., UE 103 and UE 104) between the visited mobile network 110b and the home mobile network 110a. The intercepted communications are copied and separated into Diameter S6a/S6d messages 215 and GTP messages and signaling 213.

According to some embodiments, the copied Diameter S6a/S6d messages 215 are sent to the Diameter Processor 251a and Diameter Engine 252a. The Diameter Processor 251a operates in session mode, receiving Diameter S6a/S6d transaction signaling (e.g., session request messages and corresponding session response messages) sent from the smart passive probes 250. The Diameter Processor 251a filters the Diameter S6a/S6d messages 215 by command code field in the diameter header, processes and parses the messages, and sends the only relevant messages to the Diameter Engine 252a. For example, messages or signaling indicative of deterioration or improvement in a mobile subscriber's data roaming experience are considered relevant. Additionally, relevant Diameter S6a/S6d messages may be messages related to subscriber transaction initiation, tear down, or update.

According to some embodiments, the Diameter Engine 252a receives the relevant processed and parsed messages from the Diameter Processor 251a. The Diameter Engine 252a correlates the Diameter S6a/S6d messages on a per subscriber basis and per transaction basis. According to some embodiments, the Diameter Engine 252a may further analyze the messages and/or transactions according to Table 1. The Diameter Engine 252a may analyze the messages and/or transactions by extract relevant information necessary to calculate an RSI and send the relevant information to the Subscriber Alarming and Reporting (SAR) module 280. In other embodiments, the SAR module 280 may perform the further analysis itself

TABLE 1

Relevant S6a/S6d Diameter Transactions

| Message Type value (Decimal) | Message | Weight | Subsequent | Cause Code Analysis |
|---|---|---|---|---|
| 316 | 3Gpp-Update-Location-Request | High | Yes | No |
| 316 | 3GPP-Update-Location-Answer | High | No | Yes |
| 317 | 3GPP-Cancel-Location-Request | Low | Yes | No |
| 317 | 3GPP-Cancel-Location-Answer | Low | No | Yes |
| 319 | 3GPP-Insert-Subscriber-Data-Request | High | Yes | No |
| 319 | 3GPP-Insert-Subscriber-Data-Answer | High | No | Yes |
| 320 | 3GPP-Delete-Subscriber-Data-Request | High | Yes | No |
| 320 | 3GPP-Delete-Subscriber-Data-Answer | High | No | Yes |
| 322 | 3GPP-Reset-Request | Low | Yes | No |
| 322 | 3GPP-Reset-Answer | Low | No | Yes |
| 323 | 3GPP-Notify-Request | Low | Yes | No |
| 323 | 3GPP-Notify-Answer | Low | No | Yes |

Table 1 shows the message type value, the message name, relative weight, whether there is a subsequent message to complete a transaction, and if a cause code analysis is necessary. The relative weight given to the message reflects how influential the message is on mobile subscriber's data roaming experience. According to some embodiments, when a Diameter S6a/S6d message is intercepted by the smart passive probes 250 the Diameter Processor 251a reads the header and identifies the message type value corresponding to the message. For example, if the message type value in the Diameter S6a/S6d message header is 316, the Diameter Processor 251a recognizes the Diameter S6a/S6d message as a 3GPP-Update-Location-Request, which according to this embodiment is relevant. The Diameter Processor 251a processes the 3GPP-Update-Location-Request and sends it to the Diameter Engine 252a. The Diameter Engine 252a correlates the 3GPP-Update-Location-Request with the corresponding mobile subscriber (e.g., UE 104). The Diameter Engine 252a also seeks to associate the 3GPP-Update-Location-Request with a subsequent message (3GPP-Update-Location-Answer) to complete the transaction, as indicated by Table 1. Upon receiving both the 3GPP-Update-Location-Request and 3GPP-Update-Location-Answer, the Diameter Engine 252a performs a cause code analysis on the 3GPP-Update-Location-Answer in order to determine the transaction result. Continuing with the current example, the 3GPP-Update-Location-Request begins the user authentication transaction. The authentication transaction is determined to be successful once the 3GPP-Update-Location-Answer (with the matching Sequence Number) is received and the success cause code 2001 (see Table 6) is read. The Diameter Engine 252a then sends this information to the SAR 280 to be utilized for analyzing the data roaming service experience for each mobile subscriber (i.e., calculation of the RSI).

According to some embodiments, the intercepted and copied GTP messages 213 (GTPv1-C (3G), GTPv2-C (LTE), and GTP-U (3G & LTE)) are sent to the GTP Processor 251b and GTP Engine 252b. The GTP Processor 251b operates in session mode, receiving GTP session signaling (e.g., session request messages and corresponding session response messages) from the smart passive probes 250. Additionally, the GTP Processor 251b receives GTP-U data plane information including, for example, session status for data applications such as, internet browsing (HTTP), file downloads/uploads, voice over IP (VOIP), social media, etc.

The GTP Processor 251b filters the GTP signaling messages 213 by message type field in the GTP-C header, and sends only relevant messages to the GTP Engine 252b. In addition, the GTP-U information is correlated to the relevant GTP-C signaling. GTP signaling and messages indicative of a deterioration of or improvement in a mobile subscriber's data roaming experience is considered relevant.

The GTP Engine 252b receives the relevant GTP messages and signaling from the GTP Processor 251b. The GTP Engine 252b correlates the GTP-C messages on a per subscriber basis and per transaction basis. Additionally, the GTP Engine 252b may also correlate the GTP-U information by subscriber and application type. According to some embodiments, the GTP Engine 252b may further analyze the GTP-C messages according to Tables 2 and 3. The GTP Engine 252b may analyze the messages and/or transactions by extracting relevant information necessary to calculate an RSI, and send the relevant information to the SAR module 280. In other embodiments, the SAR module 280 may perform the further analysis itself.

TABLE 2

Relevant GTPv1-C (3G) Transactions

| Message Type value (Decimal) | Message | Weight | Subsequent | Cause Code Analysis |
|---|---|---|---|---|
| 17 | Create PDP Context Response | High | No | Yes |
| 19 | Update PDP Context Response | High | No | Yes |
| 20 | Delete PDP Context Request | High | Yes | No |
| 21 | Delete PDP Context Response | High | No | Yes |
| 23 | Initiate PDP Context Activation Response | Medium | No | Yes |
| 49 | Identification Response | Medium | No | Yes |
| 51 | SGSN Context Response | Low | No | Yes |
| 52 | SGSN Context Acknowledge | Low | No | No |
| 54 | Forward Relocation Response | Medium | No | Yes |
| 55 | Forward Relocation Complete | Medium | No | No |
| 56 | Relocation Cancel Request | Medium | No | No |
| 57 | Relocation Cancel Response | Medium | Yes | Yes |
| 59 | Forward Relocation Complete Acknowledge | Medium | No | Yes |
| 60 | Forward SRNS Context Acknowledge | Low | No | Yes |
| 61 | UE Registration Query Request | Low | Yes | No |
| 62 | UE Registration Query Response | Low | No | Yes |

TABLE 3

Relevant GTPv2-C (LTE) Transactions

| Message Type value (Decimal) | Message | Weight | Subsequent | Cause Code Analysis |
|---|---|---|---|---|
| 33 | Create Session Response | High | No | Yes |
| 36 | Delete Session Request | High | Yes | No |
| 37 | Delete Session Response | High | No | Yes |
| 34 | Modify Bearer Request | Medium | Yes | No |
| 35 | Modify Bearer Response | Medium | No | Yes |
| 39 | Change Notification Response | Medium | No | Yes |
| 165 | Resume Acknowledge | Medium | No | Yes |

TABLE 3-continued

Relevant GTPv2-C (LTE) Transactions

| Message Type value (Decimal) | Message | Weight | Subsequent | Cause Code Analysis |
|---|---|---|---|---|
| 65 | Modify Bearer Failure Indication | Medium | Yes | No |
| 66 | Delete Bearer Command | High | Yes | No |
| 67 | Delete Bearer Failure Indication | High | No | No |
| 69 | Bearer Resource Failure Indication | Medium | No | No |
| 96 | Create Bearer Response | High | No | Yes |
| 98 | Update Bearer Response | High | No | Yes |
| 100 | Delete Bearer Response | High | No | Yes |
| 162 | Suspend Notification | Low | Yes | No |
| 163 | Suspend Acknowledge | Low | No | No |

Tables 2 and 3 show example relevant GTP-C message type values, message names, relative weights, whether there is a subsequent message to complete a transaction, and if a cause code analysis is necessary. The relative weight given to the message reflects how influential the message is on mobile subscriber's data roaming experience. When a GTP-C message is intercepted by the smart passive probes 250 the GTP Processor 251b reads the message header and identifies the message type value corresponding to the message. For example, if the message type value in the GTPv2-C message header is 33, the GTP Processor 251b recognizes the GTPv2-C message as a Create Session Request, which, according to this embodiment, is a relevant GTPv2-C message. The GTP Processor 251b processes the Create Session Request and sends it to the GTP Engine 252b. The GTP Engine 252b correlates the Create Session Request with the corresponding mobile subscriber (e.g., UE 104). The GTP Engine 252b also seeks to associate the Create Session Request with a subsequent message (Create Session Response) to complete the transaction, as indicated by Table 3. Upon completing the transaction (receiving both the Create Session Request and Create Session Response), the GTP Engine 252b performs a cause code analysis on the Create Session Response in order to determine the transaction result. Continuing with the current example, Create Session Request initiates the creation of the GTP Session, and the GTP session is created once the Create Session Response is received with the success cause code 16—Request accepted (See Table 4). This information is sent to the SAR 280 to be utilized for analyzing data roaming service experience for each mobile subscriber.

According to some embodiments, the GTP Processor 251b may process the GTP-U data and filter relevant application transactions to send to the GTP Engine 252b. The GTP Engine 252b may correlate the relevant application transactions with the corresponding mobile subscriber and GTP-C messages. For example, the GTP-U data may contain Hypertext Transfer Protocol (HTTP) transactions, as depicted in the HTTP Call Flow of FIG. 4. Data applications running over HTTP include internet browsing, file downloads, file uploads, etc. Data service quality of applications utilizing HTTP may be determined by measuring the delay between the HTTP Post (HTTP Continuation) and the HTTP 200 OK.

Figure 4:
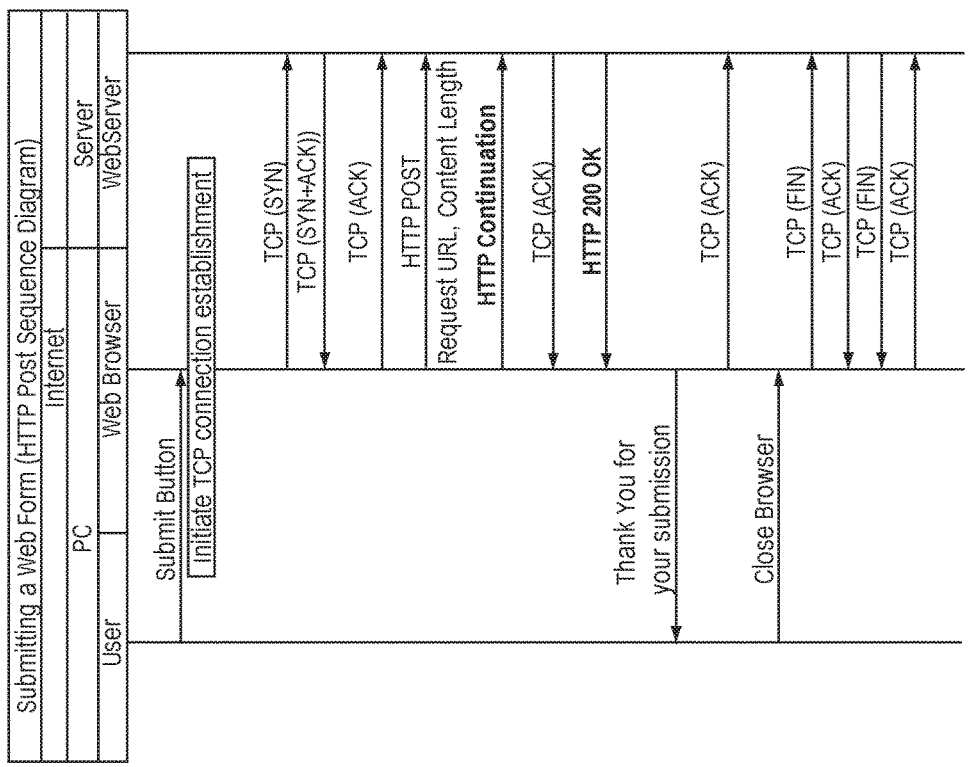
FIG. 4 is an example Hypertext Transfer Protocol (HTTP) Call Flow.

According to the example HTTP Call Flow shown in FIG. 4, a user submits a web form by clicking on the submit button for the web form. The web browser initiates a TCP connection establishment by sending a TCP (SYN). The web server responds with a TCP segment having SYN and ACK flags enabled. The three way TCP handshake is completed when the web browser responds back with a TCP (ACK). The web browser then sends the HTTP Post on the newly established TCP connection. The post contains the form data that was entered by the user. In this example, the HTTP Post is longer than one TCP segment and requires a second TCP segment. After receiving the HTTP Post, the web server sends a TCP (ACK) to acknowledge the receipt of the two TCP segments for the HTTP Post. The web server also acknowledges the HTTP Post with a "HTTP 200 OK". The web browser then sends a TCP (ACK) in response to the TCP segment containing "HTTP 200 OK" from the web server. After the user closes the web browser, the web browser and the web server initiates the TCP connection release.

Figure 5:
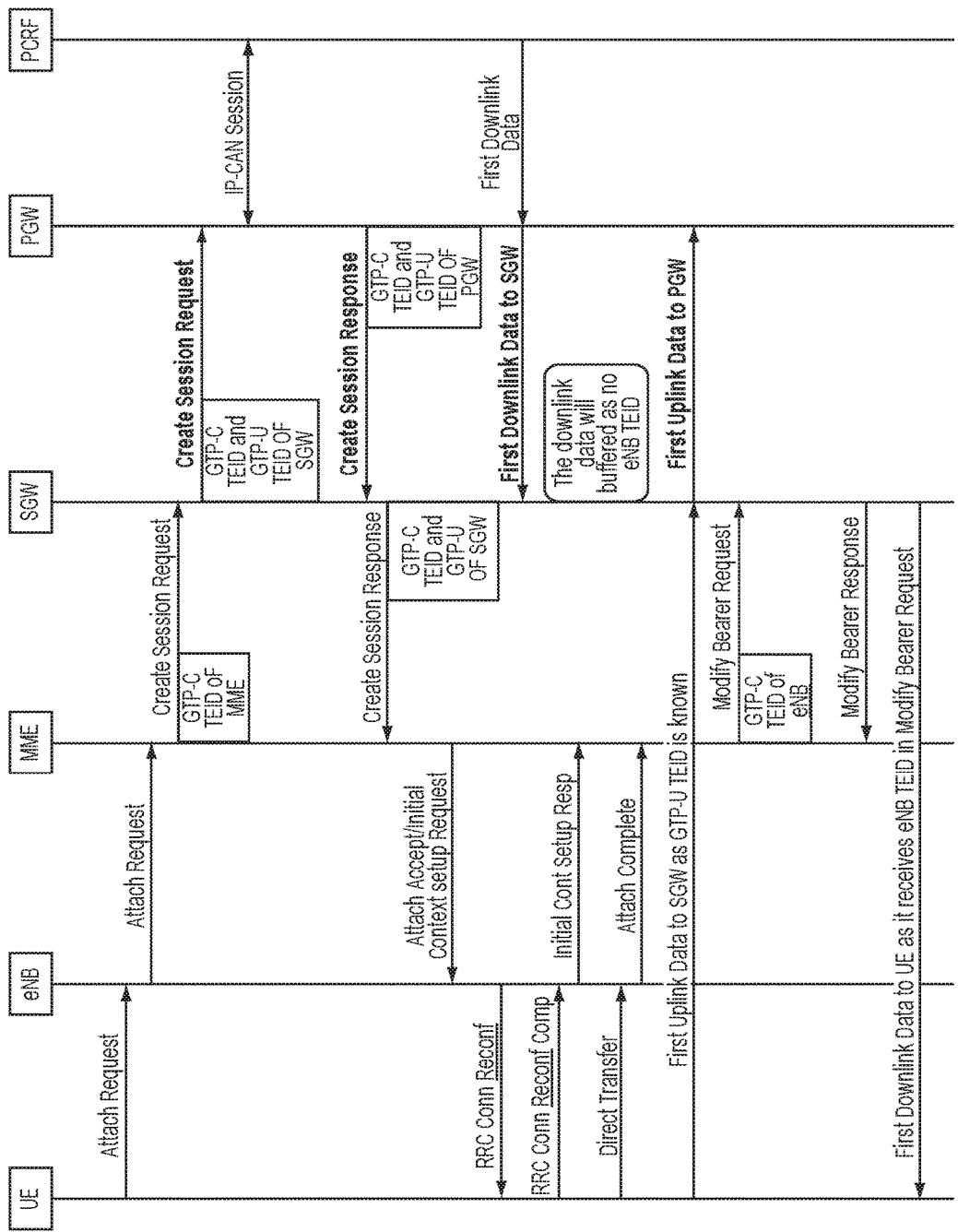
FIG. 5 illustrates a data service flow connection highlighting the relevant messages between a serving gateway of the visited network and a packet gateway of the home network.

According to some embodiments, different types of data service protocols may be combined to analyze the data roaming service experience for individual mobile subscribers. FIG. 5 illustrates a data service flow connection highlighting the relevant messages between a serving gateway of the visited network and a packet gateway of the home network.

According to some embodiments, the GTP Engine 252b may analyze the signaling follow and the message sequence flow (including the cause code) for data applications that use well know protocols, such as HTTP and SIP. The GTP Engine 252b may report the accuracy of the signaling flow and message flow to the SAR module 280 and the accuracy of the flows may be considered in the calculation of the roaming satisfaction indicator (RSI).

If the data applications are encrypted or do not use well know protocols, the smart passive probes 250 may extract the signature type from the application data to identify the application. From the extracted signature type and the GTP-C messages, the GTP Engine 252b may determine the amount of delay of the application data. The SAR module 280 may evaluate if the amount of delay produces a positive user experience or a negative user experience, and how the delay impacts a mobile subscriber's RSI.

Tables 4, 5, and 6 show GTPv1-C, GTPv2-C, and Diameter S6a/S6d cause codes respectively. If a GTPv1-C, GTPv2-C, or Diameter S6a/S6d message indicates a cause code analysis is necessary, the cause code in the message is extract, and utilizing the appropriate table, the cause code's meaning and classification can be retrieved.

TABLE 4

GTPv1-C (3G) Cause Codes

| Cause | Value (Decimal) | Classification |
|---|---|---|
| Request accepted | 128 | Normal |
| New PDP type due to network preference | 129 | Normal |
| New PDP type due to single address bearer only | 130 | Normal |
| Non-existent | 192 | Reject |
| Invalid message format | 193 | Reject |
| IMSI/IMEI not known | 194 | Reject |
| MS is GPRS Detached | 195 | Reject |
| MS is not GPRS Responding | 196 | Reject |
| MS Refuses | 197 | Reject |
| Version not supported | 198 | Reject |
| No resources available | 199 | Reject |
| Service not supported | 200 | Reject |
| Mandatory IE incorrect | 201 | Reject |
| Mandatory IE missing | 202 | Reject |
| Optional IE incorrect | 203 | Reject |

TABLE 4-continued

GTPv1-C (3G) Cause Codes

| Cause | Value (Decimal) | Classification |
|---|---|---|
| System failure | 204 | Reject |
| Roaming restriction | 205 | Reject |
| P-TMSI Signature mismatch | 206 | Reject |
| GPRS connection suspended | 207 | Reject |
| Authentication failure | 208 | Reject |
| User authentication failed | 209 | Reject |
| Context not found | 210 | Reject |
| All dynamic PDP addresses are occupied | 211 | Reject |
| No memory is available | 212 | Reject |
| Relocation failure | 213 | Reject |
| Unknown mandatory extension header | 214 | Reject |
| Semantic error in the TFT operation | 215 | Reject |
| Syntactic error in the TFT operation | 216 | Reject |
| Semantic errors in packet filter(s) | 217 | Reject |
| Syntactic errors in packet filter(s) | 218 | Reject |
| Missing or unknown APN | 219 | Reject |
| Unknown PDP address or PDP type | 220 | Reject |
| PDP context without TFT already activated | 221 | Reject |
| APN access denied - no subscription | 222 | Reject |
| APN Restriction type incompatibility with currently active PDP Contexts | 223 | Reject |
| MS MBMS Capabilities Insufficient | 224 | Reject |
| Invalid Correlation-ID | 225 | Reject |
| MBMS Bearer Context Superseded | 226 | Reject |
| Bearer Control Mode violation | 227 | Reject |
| Collision with network initiated request | 228 | Reject |
| APN Congestion | 229 | Reject |
| Bearer handling not supported | 230 | Reject |
| "Target access restricted for the subscriber" | 231 | Reject |

TABLE 5

GTPv2-C (LTE) Cause Codes

| Cause value (decimal) | Meaning | Classification |
|---|---|---|
| 2 | Local Detach | Normal |
| 3 | Complete Detach | Normal |
| 4 | RAT changed from 3GPP to Non-3GPP | Normal |
| 5 | ISR deactivation | Normal |
| 6 | Error Indication received from RNC/eNodeB/S4-SGSN | Network Error |
| 7 | IMSI Detach Only | Normal |
| 8 | Reactivation Requested | Normal |
| 9 | PDN reconnection to this APN disallowed | Network Error |
| 10 | Access changed from Non-3GPP to 3GPP | Normal |
| 11 | PDN connection inactivity timer expires | Network Error |
| 12 | PGW not responding | Network Error |
| 13 | Network Failure | Network Error |
| 14 | QoS parameter mismatch | Network Error |
| 16 | Request accepted | Normal |
| 17 | Request accepted partially | Normal |
| 18 | New PDN type due to network preference. | Normal |
| 19 | New PDN type due to single address bearer only. | Normal |
| 64 | Context Not Found | Network Error |
| 65 | Invalid Message Format | Network Error |
| 66 | Version not supported by next peer | Network Error |
| 67 | Invalid length | Network Error |
| 68 | Service not supported | User Error |
| 69 | Mandatory IE incorrect | Network Error |
| 70 | Mandatory IE missing | Network Error |
| 72 | System failure | Network Error |
| 73 | No resources available | Network Error |
| 74 | Semantic error in the TFT operation | Network Error |
| 75 | Syntactic error in the TFT operation | Network Error |
| 76 | Semantic errors in packet filter(s) | Network Error |
| 77 | Syntactic errors in packet filter(s) | Network Error |
| 78 | Missing or unknown APN | User Error |
| 80 | GRE key not found | Network Error |
| 81 | Relocation failure | Network Error |
| 82 | Denied in RAT | User Error |
| 83 | Preferred PDN type not supported | Network Error |
| 84 | All dynamic addresses are occupied | Network Error |
| 85 | UE context without TFT already activated. See NOTE 6. | Network Error |
| 86 | Protocol type not supported | Network Error |
| 87 | UE not responding. See NOTE 7. | User Error |
| 88 | UE refuses | User Error |
| 89 | Service denied. See NOTE 7. | Network Error |
| 90 | Unable to page UE | Network Error |
| 91 | No memory available | User Error |
| 92 | User authentication failed | User Error |
| 93 | APN access denied - no subscription | User Error |
| 94 | Request rejected (reason not specified) | System Error |
| 95 | P-TMSI Signature mismatch | User Error |
| 96 | IMSI/IMEI not known | User Error |
| 100 | Remote peer not responding | Network Error |
| 101 | Collision with network initiated request | Network Error |
| 102 | Unable to page UE due to Suspension | Network Error |
| 103 | Conditional IE missing | Network Error |
| 104 | APN Restriction type Incompatible with currently active PDN connection | User Error |
| 105 | Invalid overall length of the triggered response message and a piggybacked initial message | System Error |
| 106 | Data forwarding not supported | System Error |
| 107 | Invalid reply from remote peer | System Error |
| 108 | Fallback to GTPv1 | Normal |
| 109 | Invalid peer | System Error |
| 110 | Temporarily rejected due to handover/TAU/RAU procedure in progress | Normal |
| 112 | Request rejected for a PMIPv6 reason (see 3GPP TS 29.275 [26]). | System Error |
| 113 | APN Congestion | Capacity Error |
| 114 | Bearer handling not supported | System Error |
| 115 | UE already re-attached. See NOTE 7. | Normal |
| 116 | Multiple PDN connections for a given APN not allowed | Provisioning Error |
| 117 | Target access restricted for the subscriber | Enabling LTE Service |
| 119 | MME/SGSN refuses due to VPLMN Policy | Enabling LTE Service |
| 120 | GTP-C Entity Congestion | Capacity Error |

TABLE 6

Diameter S6a/S6d Cause Codes

| Cause Code | Cause Code value (Decimal) |
|---|---|
| DIAMETER_SUCCESS | 2001 |
| DIAMETER_LIMITED_SUCCESS | 2002 |
| DIAMETER_COMMAND_UNSUPPORTED | 3001 |
| DIAMETER_UNABLE_TO_DELIVER | 3002 |
| DIAMETER_REALM_NOT_SERVED | 3003 |
| DIAMETER_TOO_BUSY | 3004 |
| DIAMETER_LOOP_DETECTED | 3005 |

TABLE 6-continued

Diameter S6a/S6d Cause Codes

| Cause Code | Cause Code value (Decimal) |
|---|---|
| DIAMETER_REDIRECT_INDICATION | 3006 |
| DIAMETER_APPLICATION_UNSUPPORTED | 3007 |
| DIAMETER_INVALID_HDR_BITS | 3008 |
| DIAMETER_INVALID_AVP_BITS | 3009 |
| DIAMETER_UNKNOWN_PEER | 3010 |
| DIAMETER_AUTHENTICATION_REJECTED | 4001 |
| DIAMETER_OUT_OF_SPACE | 4002 |
| ELECTION_LOST | 4003 |
| DIAMETER_AVP_UNSUPPORTED | 5001 |
| DIAMETER_UNKNOWN_SESSION_ID | 5002 |
| DIAMETER_AUTHORIZATION_REJECTED | 5003 |
| DIAMETER_INVALID_AVP_VALUE | 5004 |
| DIAMETER_MISSING_AVP | 5005 |
| DIAMETER_RESOURCES_EXCEEDED | 5006 |
| DIAMETER_CONTRADICTING_AVPS | 5007 |
| DIAMETER_AVP_NOT_ALLOWED | 5008 |
| DIAMETER_AVP_OCCURS_TOO_MANY_TIMES | 5009 |
| DIAMETER_NO_COMMON_APPLICATION | 5010 |
| DIAMETER_UNSUPPORTED_VERSION | 5011 |
| DIAMETER_UNABLE_TO_COMPLY | 5012 |
| DIAMETER_INVALID_BIT_IN_HEADER | 5013 |
| DIAMETER_INVALID_AVP_LENGTH | 5014 |
| DIAMETER_INVALID_MESSAGE_LENGTH | 5015 |
| DIAMETER_INVALID_AVP_BIT_COMBO | 5016 |
| DIAMETER_NO_COMMON_SECURITY | 5017 |
| DIAMETER_ERROR_USER_UNKNOWN | 5001 |
| DIAMETER_ERROR_UN-KNOWN_EPS_SUBSCRIPTION | 5420 |
| DIAMETER_ERROR_RAT_NOT_ALLOWED | 5421 |
| DIAMETER_ERROR_ROAMING_NOT_ALLOWED | 5004 |
| DIAMETER_ERROR_EQUIPMENT_UNKNOWN | 5422 |
| DIAMETER_ERROR_UNKOWN_SERVING_NODE | 5423 |

Figure 6:
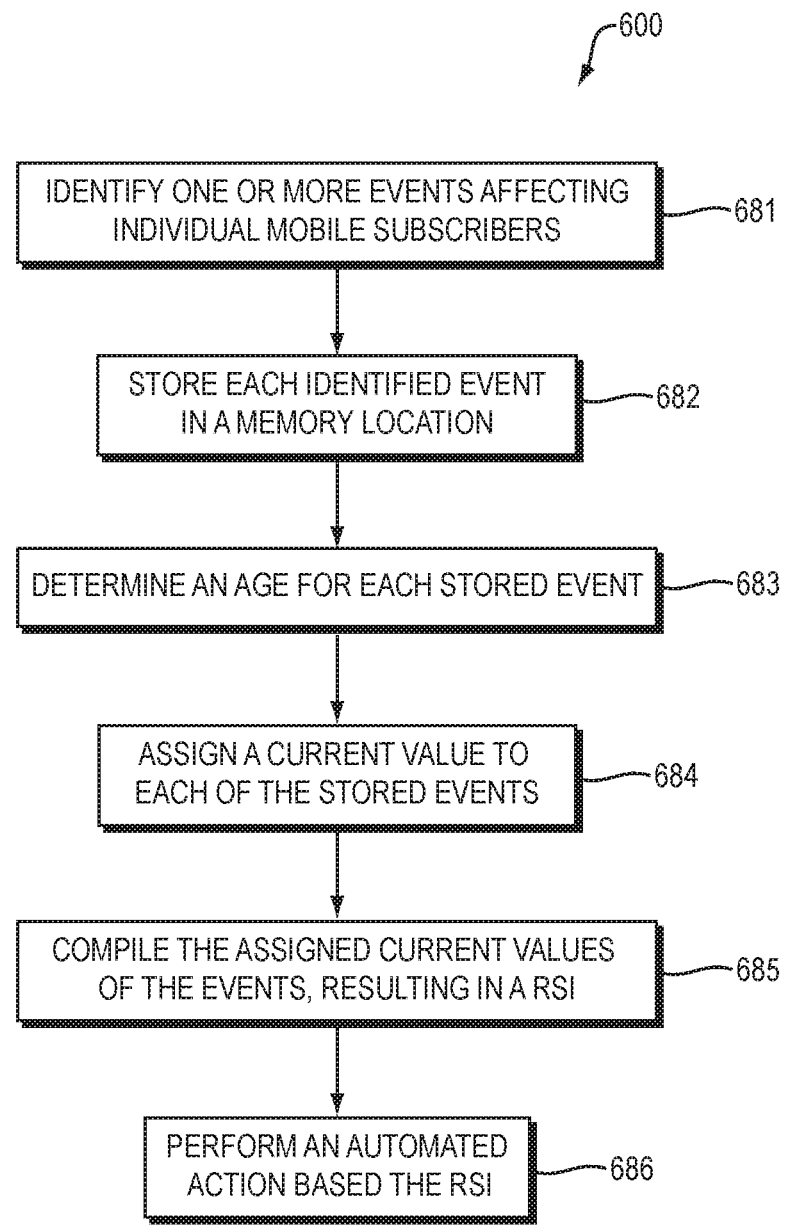
FIG. 6 is a flow chart illustrating an example method for evaluating a Roaming Satisfaction Indicator (RSI) for each individual roaming mobile subscriber.

FIG. 6 is a flow chart illustrating an example method 600 the SAR 280 uses to analyze the mobile signals, messages, metrics, and/or data from the GTP Engine 252b and the Diameter Engine 252a in order to produce a Roaming Satisfaction Indicator (RSI) for each individual roaming mobile subscriber. The RSI is a weighted time based metric that describes a roaming mobile subscriber's data service experience at any given time. According to some embodiments, the RSI is a metric or score which represents a roaming mobile subscriber's predicted level of satisfaction with their individual data roaming service. For example, a positive RSI predicts that the individual mobile subscriber is satisfied with the data service their experiences, and conversely a negative RSI predicts the mobile subscriber is unsatisfied. Further, two individual mobile subscribers roaming on the same visited mobile network and who are also subscribers to the same home mobile network may have to different RSIs depending on what types of data services they are each utilizing.

The RSI can be used to perform automated network actions, such as alert a mobile operator, message the mobile subscriber, switch the mobile subscriber's visited network, issue over the air (OTA) commands to the mobile device 103/104, reroute the data service traffic, reconfigure one or more network routers, offering the respective individual mobile subscriber a different data plan, and numerous other actions. The SAR module may perform (or trigger) different automated actions based on whether an RSI is positive or negative, as well as the RSI's value. According to some embodiments, the SAR module 280 may utilize a statistical process control method that creates control limits for an RSI. For example, when an RSI value falls below the lower control limit, an automated action is performed (or triggered).

According to some embodiments, a mobile subscriber may be automatically offered to upgrade the mobile subscriber's data plan/policy based on the respective value of the mobile subscriber's RSI. For example, if a mobile subscriber's RSI is negative and the SAR module 280 determines the mobile subscriber's data plan/policy is at least partially the cause, then the SAR module 280 may be configured to send the mobile subscriber an offer to upgrade their data plan/policy. A mobile subscriber's data plan/policy may be the cause of a negative RSI, if for instance, the data plan/policy limits the mobile subscriber's data roaming bandwidth. Another data plan/policy issue may be a mobile subscriber's data plan/policy has data roaming disabled, which would cause the mobile device to receive repeated authentication failure messages. In either example, the SAR module 280 may automatically send an offer to the mobile subscriber to change his/her data plan to resolve issues at least partially causing the negative RSI.

According to some embodiments, the SAR module 280 may automatically reconfigure or bypass one or more routers (or other network elements) in the inter-service provider network 110c (or anywhere in between the visited mobile network and the home mobile network) based on a mobile subscriber's RSI, or an aggregated RSI for a group of mobile subscribers. One or more routers along the interconnect path may become congested or misconfigured and cause the RSI value to decrease or become negative. The SAR module 280 may, in addition to evaluating the RSI, decompose the RSI and/or the events to extract metrics that indicate the need for a router reconfiguration or a bypass. For instance, the SAR module 280 may automatically reconfigure or bypass one or more routers when an RSI value is less than a certain threshold, and/or when specific events have occurred over a pre-determined time period.

According to some embodiments, the SAR module 280 may automatically block data service or reroute data service traffic using different paths among one or more mobile networks. The traffic may be rerouted via the Border Gateway Protocol (BGP) by manipulating IP routing protocols in the inter-service provider network 110c that "force" the data service traffic to be rerouted via another path. BGP is a dynamic IP routing protocol, where every network element shares its routing table within the same network, meaning that one change in the BGP parameters may affect or force routing changes in the entire network.

According to some embodiments, the SAR module 280 may automatically switch the respective individual mobile subscriber's visited network by issuing or causing over-the-air (OTA) commands to be issued to the mobile subscriber's UE (i.e., mobile device). OTA commands or programming give a mobile network operator the ability to remotely configure UE on their network using short message service (SMS) messages. OTA commands and programming are described and defined in Rel-6 TS 23.048, including ETSI TS 102 225, ETSI TS 102 226, 3GPP TS 31.115, and 3GPP TS 31.116 (herein incorporated by reference).

In some embodiments, the SAR module 280 may automatically switch the respective individual mobile subscriber's visited network by sending an OTA command to the mobile's subscriber's UE, causing the UE to reset and then attach/connect to another visited network. In some embodiments, the SAR module 280 may alert the home network 110a to send the OTA command to reset the mobile subscriber's UE. In other embodiments, the SAR module 280 may trigger the OTA reset command using an application program interface (API) with the home network 110a.

In some embodiments, the SAR module 280 may automatically instruct the mobile network operator to reset an Evolved Packet Core (EPC) network element signaling link. By resetting an EPC elements signaling links (e.g., S6a, Gr, S8, Gp), a mobile subscriber's UE would be forced to reattach and the UE would receive a new IP and the data connection would restart.

Upon receiving GTP-C, GTP-U, and Diameter S6a/S6d signals and messages from the GTP Engine 252b and the Diameter Engine 252a, the SAR 280 identifies one or more events affecting individual mobile subscribers 681 based on predetermined combinations of one or more of the received GTP-C, GTP-U, and Diameter S6a/S6d signals and messages. The one or more events are roaming data services events that a roaming mobile subscriber experiences that affects the quality that particular user's roaming data service, and thus affect the mobile subscriber's satisfaction level with the data service.

According to some embodiments, the events can be made up of one or more metrics, messages, and/or signals, or any other measurable quality of service indicator. The compositions of the events are completely customizable and may depend on, for example, the mobile subscriber, the visited mobile network, the region the subscriber is roaming in, the home mobile network, etc.

According to some embodiments, events affecting mobile subscribers have varying impact levels that may be positive or negative. For example, an Authentication Failure (See FIG. 8) is an event with a relatively small negative impact on the mobile subscriber's data roaming service experience. Thus, the Authentication Failure lowers the mobile subscriber's RSI, but only by a small amount.

Next, the SAR 280 stores each identified event in a memory location 682 with the time the event occurred, the event type, the event impact level (or amount of impact), and the IMSI (or another mobile subscriber identifier) of the respected mobile subscriber.

With the information necessary to calculate an RSI for each individual mobile subscriber, the SAR 280 then determines an age for each stored event 683 by comparing the time the event occurred to the current time. The SAR 280 is then able to assign a current value to each of the stored events 684 as a function of the determined age, the event type, the impact level.

Next, the SAR 280 compiles the assigned current values of the events 685, resulting in the RSI for an individual mobile subscriber at a particular time. The SAR 280 may then perform an automated action based on the RSI 686 of the at least one of individual mobile subscriber. According to some embodiments, the SAR 280 aggregates the RSIs of multiple subscribers and performs an automated action based on the aggregated RSIs. The aggregated RSI is indicative of potential data roaming service issues facing a group of subscribers which may be roaming in the same region, attached to the same visited mobile network, or associated with the same home mobile network. Alternatively, the aggregated RSI may also indicate the data roaming service is running as expected.

Figure 7:
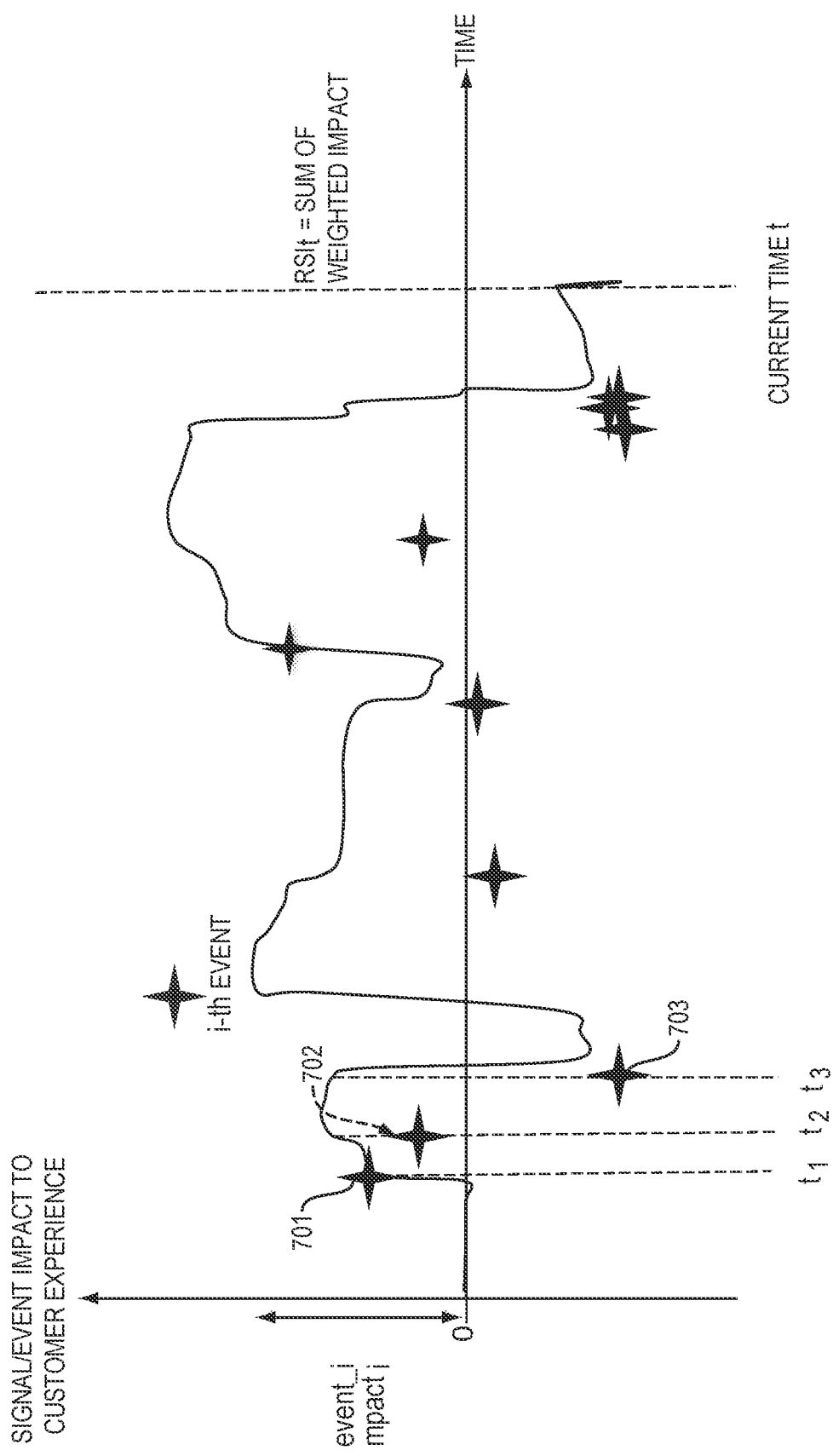
FIG. 7 is a graph illustrating an example RSI of an individual mobile subscriber changing over time.

FIG. 7 is a graph illustrating an example RSI of an individual mobile subscriber changing over time. The value of the RSI is represented by the height of the line at any given time and the stars represent an event occurring that affects the value of the RSI. According to some embodiments, the RSI may begin with a value of 0. This may be when a roaming mobile subscriber first attaches to a visited network and has not utilized any data services. An RSI value of 0 represents a neutral level of satisfaction for the mobile subscriber. As events occur, the RSI indicator value changes depending on whether the event was negative or positive and the impact level of the event.

According to other embodiments, the RSI for an individual mobile subscriber may begin with any value. For example, the RSI may begin with a value of 10. Further, the RSI may operate on any number of scales or relative values. The impact level (or value) of each event may also have any value relative to each other event. The values shown and described in this disclosure are for illustrative purposes.

For example, at time $t_1$ the mobile subscriber experiences an event 701. The event 701 has a positive impact on the mobile subscriber's data roaming experience, thus increasing the mobile subscriber's RSI. At time $t_2$ the mobile subscriber experiences another event 702. The event 702 is also positive, but has a smaller impact on the mobile subscriber's data roaming experience and only increases the mobile subscriber's RSI a small amount. In between time $t_2$ and time $t_3$ the mobile subscriber's RSI slowly decreases. As time passes, the impact value of events decrease and the RSI moves toward a neutral value. According to some embodiments, the absolute value of the RSI always moves towards zero (neutrality) in between events. In other embodiments, the RSI may always move toward any value defined as a neutral value, or a base level of satisfaction. Regardless of the actual value the RSI moves towards (i.e., the equilibrium value), the change in the RSI over time represents the fading impact of the events on the satisfaction level of the mobile subscriber as time passes. With the passage with of enough time with no events occurring the RSI will eventually return to zero.

Continuing with the current example, at time $t_3$ the mobile subscriber experiences the event 703. The event 703 is negative and has a large enough impact value to decrease the mobile subscriber's RSI into a negative value. A negative RSI value represents a prediction that the mobile subscriber is dissatisfied with their data roaming service at that point in time.

FIG. 8 is an illustration of an example RSI calculation at a particular time, according to some embodiments. FIG. 8 shows that a mobile subscriber has experienced eight events that are currently impacting the mobile subscriber's RSI. The eight events have been stored with their respective type, impact level, and time of occurrence. From that information the age of each event is determined and then a weighted value of the event is calculated as a function of the event type and age of the event. The weighted value is always closer to 0 than the event's initial impact level, because impact values of events decay (i.e., fade) over time. The weighted value may be based on any equation that decays the value (or absolute value) of the initial impact over time. For example, the rate of decay may be linear and may fully decay over 120 minutes. Thus, the weighted impact as a function of event impact and age of the event would be described by the equation $$A * \left( \frac{120 - T}{120} \right),$$

where A is the initial impact value, and T is the age of the event in minutes. Thus, an event with an initial impact of −2 would have a value of −1 after 60 minutes, and a value of 0 after 120 minutes.

According to some embodiments, regardless of the value of a mobile subscriber's RSI, if no further events occur and given enough time, the RSI will eventually return to 0. The weighted value for each event is then added together and the result is the RSI at the given time. According to some embodiments, the RSI may be held to a maximum or minimum value and/or the RSI may be scaled to a particular range of values.

FIG. 9 is an illustration of an example RSI calculation at a particular time, according to other embodiments. The example RSI calculation of FIG. 9 allows for more adjustment in the rate of decay of the initial event impact, for instance the each event type may have a different half-life (i.e., the time until the event's impact value is halved) and a different stabilization value. The stabilization value is the impact value the event stabilizes at and no longer continues to decay. Thus, according to this embodiment, the impact value of each event does not necessarily decay to 0 over time. According to some embodiments, after a certain period of time events may be excluded from the RSI calculation, even if their stabilization value is not 0.

Another aspect of this embodiment is the weighted value may be based on an equation that takes into account the added variables (half-life and stabilization value) and calculates a current impact value based on an exponential or non-linear rate of decay. For example, the weighted impact as a function of initial event impact, half-life, stabilization value, and age of the event may be described by the equation, $$A * \left(1 - S * \left(\frac{1}{1 + e^{\left(-5.4 * \frac{T-H}{H}\right)}}\right)\right)$$

where A is the initial impact value, S is the stabilization value expressed as a percentage, H is the half-life, and T is the age of the event in minutes. The RSI calculation illustrated in FIG. 9 reflects the use of this equation.

Figure 10:
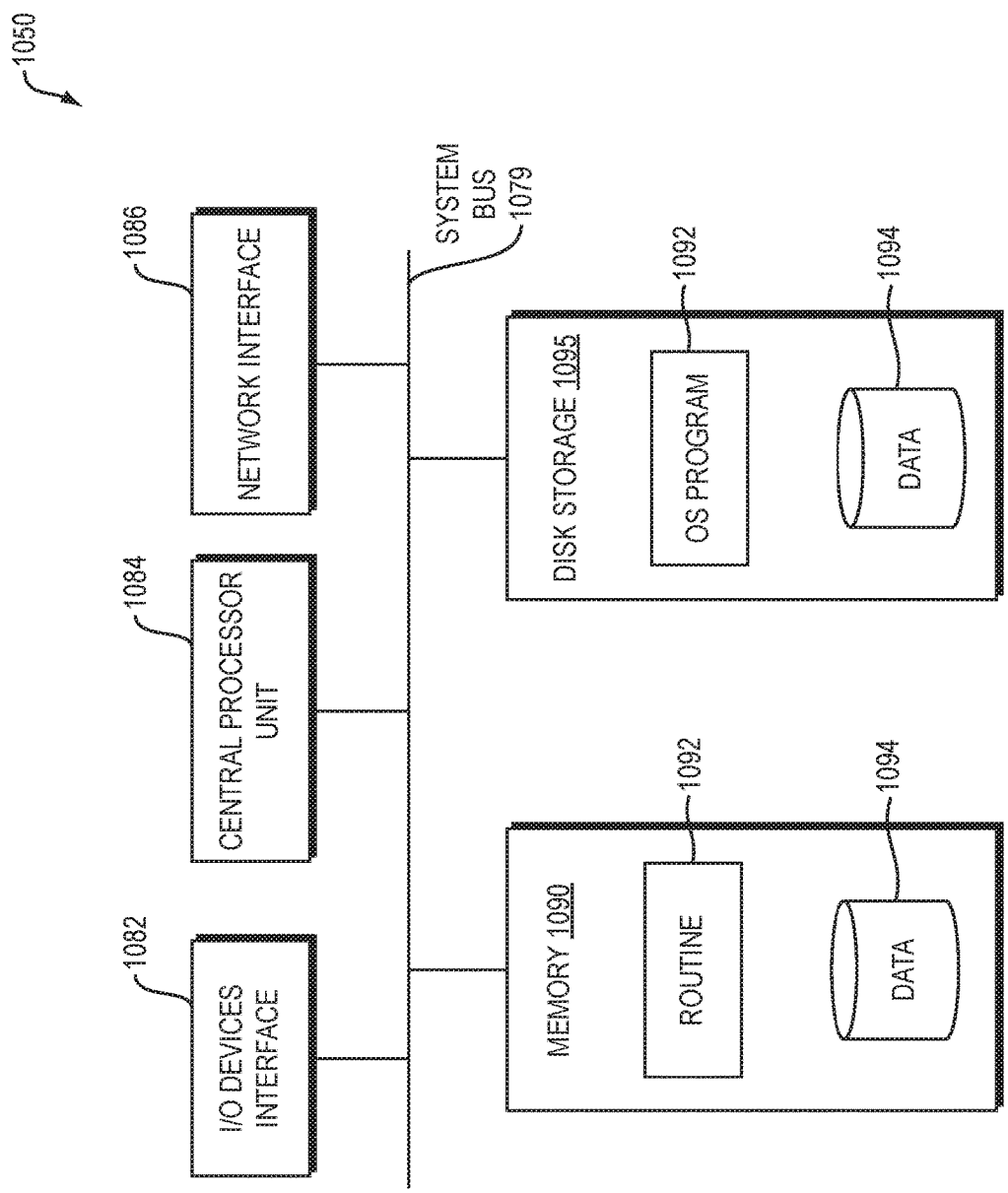
FIG. 10 is a block diagram of the internal structure of a computer in which various embodiments of the present disclosure may be implemented.

FIG. 10 is a block diagram of the internal structure of a computer 1050 in which various embodiments of the present invention may be implemented. The computer 1050 contains a system bus 1079, where a bus is a set of hardware lines used for data transfer among the components of a computer or processing system. Bus 1079 is essentially a shared conduit that connects different elements of a computer system (e.g., processor, disk storage, memory, input/output ports, network ports, etc.) that enables the transfer of information between the elements. Attached to system bus 1079 is I/O device interface 982 for connecting various input and output devices (e.g., keyboard, mouse, displays, printers, speakers, etc.) to the computer 1050. Network interface 1086 allows the computer 1050 to connect to various other devices attached to a network. Memory 1090 provides volatile storage for computer software instructions 1092 (e.g., instructions for the process 600 of FIG. 6 for performing an automated action based on a calculated RSI) and data 1094 used to implement an embodiment of the present invention (e.g., to store each event). Disk storage 1095 provides non-volatile storage for computer software instructions 1092 and data 1094 used to implement an embodiment of the present invention. Central processor unit 1084 is also attached to system bus 1079 and provides for the execution of computer instructions.

In one embodiment, the processor routines 1092 (e.g., instructions for the process 600 of FIG. 6 for performing an automated action based on a calculated RSI) and data 1094 are a computer program product (generally referenced 1092), including a computer readable medium (e.g., a removable storage medium such as one or more DVD-ROM's, CD-ROM's, diskettes, tapes, etc.) that provides at least a portion of the software instructions for the invention system. Computer program product 1092 can be installed by any suitable software installation procedure, as is well known in the art.

In another embodiment, at least a portion of the software instructions may also be downloaded over a cable, communication and/or wireless connection.

Further, the present invention may be implemented in a variety of computer architectures. The computer of FIG. 10 is for purposes of illustration and not limitation of the present invention.

While example embodiments have been particularly shown and described, it will be understood by those skilled in the art that various changes in form and details may be made therein without departing from the scope encompassed by the appended claims.

It should be understood that the example embodiments described above may be implemented in many different ways. In some instances, the various methods and machines described herein may each be implemented by a physical, virtual or hybrid general purpose computer having a central processor, memory, disk or other mass storage, communication interface(s), input/output (I/O) device(s), and other peripherals. The general purpose computer is transformed into the machines that execute the methods described above, for example, by loading software instructions into a data processor, and then causing execution of the instructions to carry out the functions described, herein.

As is known in the art, such a computer may contain a system bus, where a bus is a set of hardware lines used for data transfer among the components of a computer or processing system. The bus or busses are essentially shared conduit(s) that connect different elements of the computer system, e.g., processor, disk storage, memory, input/output ports, network ports, etc., which enables the transfer of information between the elements. One or more central processor units are attached to the system bus and provide for the execution of computer instructions. Also attached to system bus are typically I/O device interfaces for connecting various input and output devices, e.g., keyboard, mouse, displays, printers, speakers, etc., to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

In certain embodiments, the procedures, devices, and processes described herein constitute a computer program product, including a non-transitory computer-readable medium, e.g., a removable storage medium such as one or more DVD-ROM's, CD-ROM's, diskettes, tapes, etc., that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A method for performing an automated action based on a roaming satisfaction indicator (RSI), comprising:
   monitoring a plurality of mobile signals and metrics for each individual mobile subscriber in a group, the group including one or more individual mobile subscribers;
   identifying a plurality of events affecting each individual mobile subscriber in the group, each event being identified based on predetermined combinations of one or more of the plurality of mobile signals and metrics;
   storing each identified event in a memory location with a time the event occurred, a predetermined event type, and a predetermined impact level;
   evaluating a roaming satisfaction indicator for each individual mobile subscriber at a given time by:
      determining an age for each stored event by comparing the time the event occurred and the given time,
      assigning a current value to each of the stored events as a function of the determined age, the predetermined event type, and the predetermined impact level, and
      compiling the assigned current values of the events, resulting in the roaming satisfaction indicator at the given time; and
   automatically performing an action based on at least one roaming satisfaction indicator at the given time.

2. The method of claim 1 further comprising:
   aggregating the roaming satisfaction indicator of each individual mobile subscriber in the group at the given time, resulting in an aggregated roaming satisfaction indicator; and
   automatically performing an action based on the aggregated roaming satisfaction indicator.

3. The method of claim 2 wherein the roaming satisfaction indicators are aggregated by a combination of factors.

4. The method of claim 3 wherein the combination of factors includes region, visited mobile network, or home mobile network.

5. The method of claim 2 wherein the action based on the aggregated roaming satisfaction indicator is alerting a mobile network operator of data roaming service issues.

6. The method of claim 1 further comprising:
   decomposing the roaming satisfaction indicator of a given individual mobile subscriber in the group at the given time, resulting in at least one decomposed part of the roaming satisfaction indicator; and
   automatically performing an action based on the at least one decomposed part of the roaming satisfaction indicator.

7. The method of claim 6 wherein the action is reconfiguring one or more network routers.

8. The method of claim 6 wherein the action is blocking data service or rerouting data service traffic using different paths among one or more mobile networks.

9. The method of claim 1 wherein the action based on at least one roaming satisfaction indicator at the given time is switching the respective individual mobile subscriber's visited network.

10. The method of claim 1 wherein the action based on at least one roaming satisfaction indicator at the given time is alerting the respective individual mobile subscriber of data roaming service issues.

11. The method of claim 1 further comprising determining a respective individual mobile subscriber's data plan is negatively affecting the respective roaming satisfaction indicator, wherein the action is offering the respective individual mobile subscriber a different data plan and updating the respective individual mobile subscriber's data plan.

12. A system for performing an automated action based on a roaming satisfaction indicator (RSI), comprising:
   a network traffic monitor communicatively coupled to a mobile network, the network traffic monitor configured to monitor a plurality of mobile signals and metrics for each individual mobile subscriber in a group, the group including one or more individual mobile subscribers; and
   a subscriber alarming and reporting (SAR) module communicatively coupled to the network traffic monitor, the SAR module configured to:
      identify a plurality of events affecting each individual mobile subscriber in the group, each event being identified based on predetermined combinations of one or more of the plurality of mobile signals and metrics,
      store each identified event in a database with a time the event occurred, a predetermined event type, and a predetermined impact level,
      evaluate a roaming satisfaction indicator for each individual mobile subscriber at a given time by:
         determining an age for each stored event by comparing the time the event occurred and the given time,
         assigning a current value to each of the stored events as a function of the determined age, the predetermined event type, and the predetermined impact level, and
         compiling the assigned current values of the events, resulting in the roaming satisfaction indicator at the given time,
      automatically perform an action based on at least one roaming satisfaction indicator at the given time.

13. The system of claim 12 wherein the SAR module is further configured to:
   aggregate the roaming satisfaction indicator of each individual mobile subscriber in the group at the given time, resulting in an aggregated roaming satisfaction indicator; and
   automatically perform an action based on the aggregated roaming satisfaction indicator.

14. The system of claim 13 wherein the SAR module aggregates the roaming satisfaction indicators based on a combination of factors.

15. The system of claim 14 wherein the combination of factors includes region, visited mobile network, or home mobile network.

16. The system of claim 13 wherein the action based on the aggregated roaming satisfaction indicator is alerting a mobile network operator of data roaming service issues.

17. The system of claim 12 wherein the SAR module is further configured to:
  decompose the roaming satisfaction indicator of a given individual mobile subscriber in the group at the given time, resulting in at least one decomposed part of the roaming satisfaction indicator; and
  automatically perform an action based on the at least one decomposed part of the roaming satisfaction indicator.

18. The system of claim 17 wherein the action is bypassing or reconfiguring one or more network routers.

19. The system of claim 17 wherein the action is blocking data service or rerouting data service traffic using different paths among one or more mobile networks.

20. The system of claim 12 wherein the action based on at least one roaming satisfaction indicator at the given time is switching the respective individual mobile subscriber's visited network.

21. The system of claim 12 wherein the action based on at least one roaming satisfaction indicator at the given time is alerting the respective individual mobile subscriber of data roaming service issues.

22. The system of claim 12 wherein the SAR module is further configure to determine that a respective individual mobile subscriber's data plan is negatively affecting the respective roaming satisfaction indicator, wherein the action is offering the respective individual mobile subscriber a different data plan and updating the respective individual mobile subscriber's data plan.

* * * * *